3,268,559
SUBSTITUTED DIOXEPINS
Chester E. Pawloski, Bay City, Mich., and George B. Sterling, Mogadore, Ohio, assignors to The Dow Chemical Company, Midland, Mich., a corporation of Delaware
No Drawing. Filed Dec. 11, 1963, Ser. No. 329,886
3 Claims. (Cl. 260—338)

This invention relates to novel 2-(2,3-alkyldienyl)-4,7-dihydro-1,3-dioxepins.

The compounds of this invention have the general formula

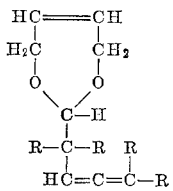

wherein each R independently represents the groups consisting of hydrogen and an alkyl group having from 1 to 6 carbon atoms.

The compounds of the present invention may be made by reacting cis-2-butene-1,4-diol with an alkyl-substituted dienal, preferably in the presence of a dialkoxyalkane and by reacting cis-2-butenediol with a 1,1-dialkoxyalkyl-2,3-diene.

The novel compounds of this invention are useful as chain transfer agents in the polymerization of vinyl monomers. They are also useful as monomers copolymerizable with vinyl monomers to prepare copolymers having specific functional groups attached thereto and as soil bactericides.

The invention is further illustrated by the following examples:

EXAMPLE 1

Charge 2,2-dimethyl-3,4-octanedienal (⅔ mole) ____gms__ 100
Cis-2-butene-1,4-diol (⅔ mole) _____gms__ 58
2,2-dimethoxypropane (⅔ mole) _____gms__ 75
Benzene _____mls__ 100
Few drops conc. sulfuric acid.

Procedure

The reactants were placed into a one liter flask and mixed. A single liquid phase was obtained from two with a noted drop in temperature. The flask was then placed on a thirty inch glass column and distilled at 3/1 reflux ratio and one atmosphere of pressure until the reaction temperature reached 124° C. The pot was then allowed to cool to room temperature. Some solid sodium carbonate was added and the distillation continued under vacuum. The cuts were analyzed by infrared spectroscopy. A 55 percent yield of 2-(1,1-dimethyl-2,3-heptadienyl)-4,7-dihydro-1,3-dioxepin was obtained. B.P. 101° C. at 0.7 mm. Hg. n 25° C. 1.4860.

EXAMPLE 2

Charge 2-ethyl-2-butyl-5-methyl-3,4-hexadienal (½ mole)
                                              gms__ 100
cis-2-butene-1,4-diol (½ mole) _____gms__ 50
2,2-dimethoxypropane (½ mole) _____gms__ 60
Benzene _____mls__ 100
Few drops conc. sulfuric acid.

Procedure

Same as above except reaction was stopped at 118° C. before cooling. A 53 percent yield of 2-(1-butyl-1-ethyl-4-methyl-2,3-pentadienyl)-4,7-dihydro-1,3-dioxepin. B.P. 139° C. at 2.2 mm. Hg. n 25° C. 1.4890.

In a manner similar to that of Examples 1 and 2, other dioxepins may be prepared by reacting other dienals such as: 3,4-pentadienal to make 2-(2,3-butadienyl)4,7-dihydro-1,3-dioxepin; 3,4-undecadienal to make 2-(2,3-decadienyl)-4,7-dihydro-1,3-dioxepin; 2 - hexyl-3,4-pentadienal to make 2-(1-hexyl-2,3-butadienyl)-4,7-dihydro-1,3-dioxepin; 2,2-dihexyl-3,4-octadienal to make 2-(1,1-dihexyl-2,3-heptadienyl)-4,7-dihydro-1,3-dioxepin; and 2,2-dihexyl-5-methyl-3,4-undecadienal to make 2-(1,1-dihexyl-4-methyl-2,3-decadienyl)-4,7-dihydro-1,3-dioxepin; with cis-2-butene-1,4-diol in the presence of 2,2-dimethoxypropane.

The use of the compounds of this invention as chain transfer agents is illustrated by the following example:

EXAMPLE 3

Procedure

Twenty-five gram charges of various percentages of styrene and 2-(1,1-dimethyl-2,3-heptadienyl)-4,7-dihydro-1,3-dioxepin and styrene and 2-(1-butyl-1-ethyl-4-methyl-2,3 - pentadienyl)-4,7-dihydro-1,3-dioxepin were placed into 2 oz. bottles with 0.1 percent benzoyl peroxide as catalyst. The samples were placed into an air oven and heated at 90° C. for 67 hours. All samples were clear and solid. The samples were removed from the bottles and made up in a 5 percent solution of polymer in toluene for viscosity checks. The following viscosities were obtained.

| Samples: | Viscosity in cps. at 25° C. |
|---|---|
| 100 percent styrene–none | 41.7 |
| 99.95 percent styrene–.05 percent 2-(1,1-dimethyl-2,3-heptadienyl) - 5,7 - dihydro-1,3-dioxepin | 6.47 |
| 99.5 percent styrene–.5 percent above dioxepin | 6.28 |
| 98.0 percent styrene–2.0 percent above dioxepin | 5.75 |
| 95.0 percent styrene–5.0 percent above dioxepin | 2.15 |
| 99.95 percent styrene–0.05 percent 2-(1-butyl-1-ethyl-4-methyl-2,3-pentadienyl) - 4,7 - dihydro-1,3-dioxepin | 24.2 |
| 99.5 percent styrene–0.5 percent above dioxepin | 5.37 |
| 98.0 percent styrene–2.0 percent above dioxepin | 4.85 |
| 95.0 percent styrene–5.0 percent above dioxepin | 5.82 |

Various modifications may be made in the present invention without departing from the spirit or scope thereof and it is understood that we limit ourselves only as defined in the appended claims.

We claim:
1. Compounds having the formula

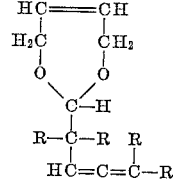

wherein each R independently represents the groups consisting of hydrogen and alkyl groups of 1–6 carbons.

2. 2-(1,1-dimethyl - 2,3 - heptadienyl)-4,7-dihydro-1,3-dioxepin.

3. 2-(1-butyl-1-ethyl-4-methyl - 2,3 - pentadienyl)-4,7-dihydro-1,3-dioxepin.

No references cited.

WALTER A. MODANCE, Primary Examiner.
N. S. MILESTONE, Assistant Examiner.